United States Patent
Chung et al.

(10) Patent No.: US 12,210,100 B2
(45) Date of Patent: *Jan. 28, 2025

(54) TIME-OF-FLIGHT DEVICE USING TWO LIGHT MODULATION FREQUENCIES AND OPERATING METHOD THEREOF

(71) Applicant: PixArt Imaging Inc., Hsin-Chu County (TW)

(72) Inventors: Yueh-Lin Chung, Hsin-Chu County (TW); Tso-Sheng Tsai, Hsin-Chu County (TW)

( * ) Notice: Subject to any disclaimer, the term of this patent is extended or adjusted under 35 U.S.C. 154(b) by 9 days.

This patent is subject to a terminal disclaimer.

(21) Appl. No.: 18/198,814

(22) Filed: May 17, 2023

(65) Prior Publication Data

US 2023/0288564 A1    Sep. 14, 2023

Related U.S. Application Data

(63) Continuation of application No. 17/007,491, filed on Aug. 31, 2020, now Pat. No. 11,693,116.

(51) Int. Cl.
| | | |
|---|---|---|
| G01C 3/08 | (2006.01) | |
| G01S 7/4911 | (2020.01) | |
| G01S 7/4913 | (2020.01) | |
| G01S 7/4915 | (2020.01) | |
| G01S 17/36 | (2006.01) | |

(52) U.S. Cl.
CPC .......... *G01S 17/36* (2013.01); *G01S 7/4911* (2013.01); *G01S 7/4913* (2013.01); *G01S 7/4915* (2013.01)

(58) Field of Classification Search
CPC ...... G01S 17/36; G01S 7/4911; G01S 7/4913; G01S 7/4915
See application file for complete search history.

(56) References Cited

U.S. PATENT DOCUMENTS

| | | | |
|---|---|---|---|
| 11,693,116 B2 * | 7/2023 | Chung ................. | G01S 7/4911 356/5.11 |
| 2019/0129017 A1 * | 5/2019 | Sadhu ................... | G01S 17/89 |
| 2021/0173086 A1 * | 6/2021 | Park ...................... | G01S 7/4816 |

FOREIGN PATENT DOCUMENTS

CN          111025320 A  *  4/2020  ............. G01S 17/36

\* cited by examiner

*Primary Examiner* — Mark Hellner
(74) *Attorney, Agent, or Firm* — Bruce Stone LLP; Joseph A. Bruce

(57) ABSTRACT

There is provided a distance measurement device including a light source, a light detector, a time control circuit and a processor. In first measurement, the time control circuit controls the light source to illuminate at a low modulation frequency, and the processor calculates a rough flying time according to a first detection signal of the light detector to determine an operating phase zone and a delay time. In second measurement, the time control circuit controls the light source to illuminate at a high modulation frequency and causes a light driving signal of the light source and a detecting control signal of the light detector to have a difference of the delay time, and the processor calculates a fine flying time according to a second detection signal of the light detector.

19 Claims, 7 Drawing Sheets

TIME-OF-FLIGHT DEVICE USING TWO LIGHT MODULATION FREQUENCIES AND OPERATING METHOD THEREOF

This application is a continuation application of U.S. patent application Ser. No. 17/007,491 filed on Aug. 31, 2020, the full disclosure of which is incorporated herein by reference.

To the extent any amendments, characterizations, or other assertions previously made (in this or in any related patent applications or patents, including any parent, sibling, or child) with respect to any art, prior or otherwise, could be construed as a disclaimer of any subject matter supported by the present disclosure of this application, Applicant hereby rescinds and retracts such disclaimer. Applicant also respectfully submits that any prior art previously considered in any related patent applications or patents, including any parent, sibling, or child, may need to be re-visited.

BACKGROUND

1. Field of the Disclosure

This disclosure generally relates to an optical distance measurement device and, more particularly, to a time-of-flight distance measurement device using two light source modulation frequencies to enhance the noise immunity and increase the detectable distance range, and an operating method thereof.

2. Description of the Related Art

Nowadays, the optical distance measurement device generally adopts the imaging technique based on a CCD image sensor or a CMOS image sensor. The method of calculating an object distance by estimating a shifted time from a light beam emitted from a light source, then reflected by an object and finally received by a light sensor is referred to the time-of-flight (TOF) technique.

The indirect time-of-flight (iTOF) technique is to modulate a light driving signal, and take a time difference between the light driving signal and a detected signal as the flying time. For example please referring to FIG. 1, there is shown a time difference between the lighting of a light source (corresponding to the light driving signal) and the reflected light being detected. The larger time difference Tf indicates a larger measured distance. The maximum of the time different Tf does not exceed the exposure interval. Accordingly, if it is desired to have a larger detectable distance range, a longer exposure interval is required.

However, a longer exposure interval means a slower light modulation frequency and a lower signal-to-noise ratio (SNR). If it is desired to increase the SNR, the light modulation frequency needs to be increased such that the detectable distance range is shortened. Thus, in actual arrangement, there is a trade-off between the SNR and the detectable distance range.

Accordingly, it is necessary to provide an iTOF distance measurement device that has a large detectable distance range and high SNR at the same time.

SUMMARY

The present disclosure provides a distance measurement device that performs the two-stage measuring using two light modulation frequencies to increase the detectable distance range and noise immunity.

The present disclosure provides a time-of-flight device including a light source, a light detector and a processor. The light source is configured to illuminate an object sequentially using a first modulation frequency and a second modulation frequency, higher than the first modulation frequency, according to a light driving signal. The light detector is configured to detect reflected light from the object to generate a first detection signal corresponding to the light source being illuminating at the first modulation frequency and detect reflected light from the object to generate a second detection signal corresponding to the light source being illuminating at the second modulation frequency according to a detecting control signal. The processor is configured to calculate an operating phase zone of a first phase according to the first detection signal, determine a delay time according to a relationship between multiple predetermined operating phase zones and multiple delay times, and use the delay time as a difference between the light driving signal and the detecting control signal when the light source is illuminating at the second modulation frequency.

The present disclosure further provides a time-of-flight device including a light source, a light detector, a time control circuit and a processor. The light source is configured to emit light to illuminate an object. The light detector is configured to detect reflected light from the object to generate a detection signal. The time control circuit is configured to control the light source to illuminate at a first modulation frequency in first measurement and to illuminate at a second modulation frequency, higher than the first modulation frequency, in second measurement. The time control circuit includes a first delay circuit and a second delay circuit. The first delay circuit is configured to delay a phase of a light driving signal of the light source. The second delay circuit is configured to delay a phase of a detecting control signal of the light detector. The processor is configured to calculate a rough phase according to the detection signal generated by the light detector in the first measurement, and determine a delay phase between the light driving signal and the detecting control signal in the second measurement according to a relationship between predetermined multiple phase zones of the rough phase and multiple delay times.

The present disclosure further provides an operating method of a time-of-flight device. The time-of-flight device includes a light source, a light detector and a processor. The operating method includes the steps of: controlling, using a light driving signal, the light source to illuminate at a first modulation frequency, and controlling, using a detecting control signal, the light detector to detect reflected light from an object to generate a first detection signal; calculating, using the processor, an operating phase zone of a first phase according to the first detection signal; determining a delay time according to a relationship between multiple predetermined operating phase zones and multiple delay times; and controlling, using the light driving signal, the light source to illuminate at a second modulation frequency, higher than the first modulation frequency, and controlling, using the detecting control signal, the light detector to detect reflected light from the object to generate a second detection signal with the delay time between the light driving signal and the detecting control signal.

In the distance measurement device of the present disclosure, the light detector is, for example, a photodiode. The first accumulator and the second accumulator include a charge storage device, such as a capacitor, used to store light energy detected by the photodiode within different time intervals.

In the distance measurement device of the present disclosure, the light detector is, for example, an avalanche diode. The first accumulator and the second accumulator include a counter, such as a ripple counter, used to count electric pulses generated by the avalanche diode within different time intervals. The counted value is positively related with the light energy detected by the avalanche diode.

BRIEF DESCRIPTION OF THE DRAWINGS

Other objects, advantages, and novel features of the present disclosure will become more apparent from the following detailed description when taken in conjunction with the accompanying drawings.

DETAILED DESCRIPTION OF THE EMBODIMENT

It should be noted that, wherever possible, the same reference numbers will be used throughout the drawings to refer to the same or like parts.

The present disclosure is related to a time-of-flight (TOF) distance measurement device using the two-stage measurement. Due to the reason that a higher signal-to-noise ratio (SNR) is obtained at a higher light modulation frequency whereas a longer detectable distance range is obtained at a lower light modulation frequency, the distance measurement device of the present disclosure sequentially uses two different light modulation frequencies to have both benefits and obtain higher noise immunity.

Figure 1:
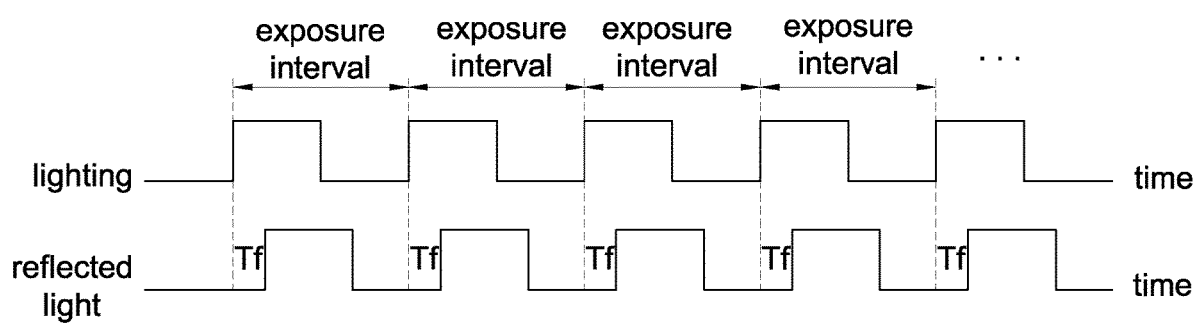
FIG. 1 is a schematic diagram of a conventional time-of-flight technique.
Figure 2:
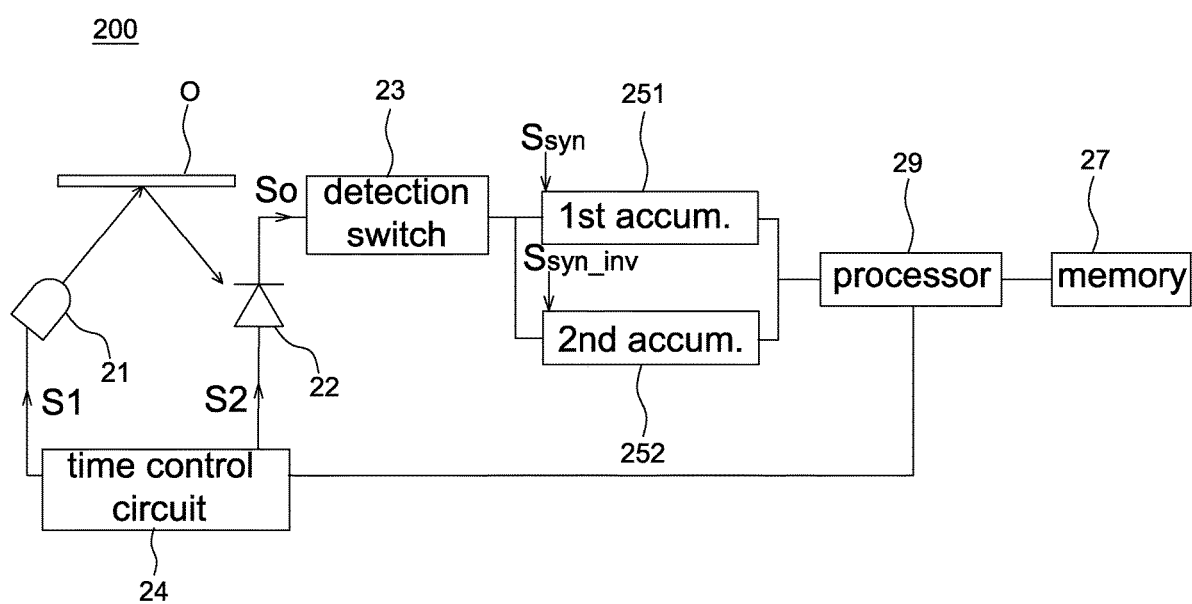
FIG. 2 is a schematic block diagram of a distance measurement device according to one embodiment of the present disclosure.

Referring to FIG. 2, it is a schematic block diagram of a distance measurement device 200 according to one embodiment of the present disclosure. The distance measurement device 200 includes a light source 21, a light detector 22, a detection switch 23, a time control circuit 24, a first accumulator 251, a second accumulator 252, a memory 27 and a processor 29 coupled to each other. In one aspect, these components are arranged in the same detection chip. In another aspect, the light detector 22, the detection switch (e.g., a transistor switch) 23, the first accumulator 251 and the second accumulator 252 form an optical sensor used to output first accumulated energy and second accumulated energy respectively accumulated within different time intervals.

In one aspect, the light source 21 is a laser diode (LD), e.g., VCSEL. In another aspect, the light source 21 is a light emitting diode (LED). The light source 21 emits light of an identifiable spectrum (e.g., red light and/or infrared light) to illuminate an object O, wherein the object O is any object within a detectable distance range of the distance measurement device 200 without particular limitations as long as the object O is able to reflect the light emitted by the light source 21. In some applications, the detectable distance range is set as large as possible. The distance measurement device 200 of the present disclosure measures a distance of the object O or constructs a depth map thereof, e.g., the distance measurement device 200 including multiple light detectors arranged in a matrix.

The light detector 22 is a photodiode or an avalanche diode, e.g., single photon avalanche diode (SPAD), wherein the operation of the photodiode and avalanche diode is known to the art and thus details thereof are not described herein. The light detector 22 is used to detect reflected light from the object O to generate a detection signal So.

The time control circuit 24 controls the light source 21 to emit light using a light driving signal S1. For example referring to FIG. 3, it is an operational schematic diagram of a distance measurement device 200 according to one embodiment of the present disclosure. The light driving signal S1 is a time-varying signal used to turn on the light source 21 within a first time interval T1 of an exposure interval and turn off the light source 21 within a second time interval T2 of the exposure interval, alternatively. It is appreciated that when a modulation frequency of the light driving signal S1 is smaller, the first time interval T1 and the second time interval T2 are longer. The time control circuit 24 further controls the light detector 22 to detect reflected light from the object O using a detecting control signal S2. In the present disclosure, the light driving signal S1 and the detecting control signal S2 are altered to have two different oscillation frequencies.

The detection switch 23 is, for example, a switching device or a multiplexer. The detection switch 23 is used to conduct the light detector 22 to the first accumulator 251 within the first time interval T1 to cause the first accumulator 251 to accumulate first light energy E1 of reflected light detected by the light detector 22, e.g., using a first synchronous signal $S_{syn}$ to control the first accumulator 251. The detection switch 23 is also used to conduct the light detector 22 to the second accumulator 252 within the second time interval T2 to cause the second accumulator 252 to accumulate second light energy E2 of reflected light detected by the light detector 22, e.g., using a second synchronous signal $S_{syn\_inv}$ to control the second accumulator 252. The first synchronous signal $S_{syn}$ is in phase with the light driving signal S1, and the second synchronous signal $S_{syn\_inv}$ is out of phase with the light driving signal S1. It is appreciated that the second synchronous signal $S_{syn\_inv}$ is generated by passing the first synchronous signal $S_{syn}$ through an inverter. In the present disclosure, as the reflected light is detected within the first time interval T1 and the second time interval T2, one exposure interval is equal to T1+T2.

In the present disclosure, the type of the first accumulator 251 and the second accumulator 252 is arranged corresponding to the light detector 22. When the light detector 22 is a photodiode, the first accumulator 251 and the second accumulator 252 are, e.g., capacitors used to accumulate charges that reflect detected energy E1 and E2 of the reflected light. When the light detector 22 is an avalanche diode, the first accumulator 251 and the second accumulator 252 are asynchronous counters, e.g., ripple counters used to count photon events of the avalanche diode that reflect detected energy E1 and E2 of the reflected light.

Figure 3:
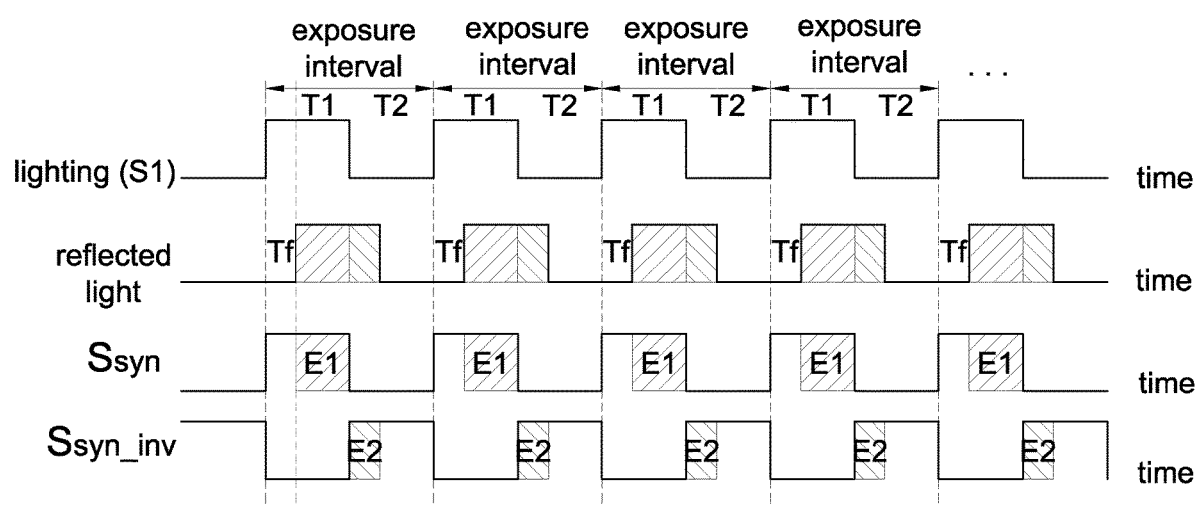
FIG. 3 is an operational schematic diagram of a distance measurement device according to one embodiment of the present disclosure.

As shown in FIGS. 2 and 3, from the light source 21 starting to emit light till the light detector 22 receiving reflected light, a time interval Tf is passed, wherein when there is no time difference between the light driving signal S1 and the detecting control signal S2, the time interval Tf is equal to a flying time; whereas when there is a time difference between the light driving signal S1 and the detecting control signal S2, the time interval Tf is equal to a summation of the flying time and the time difference. Said time difference is described using a delay time below.

Figure 4:
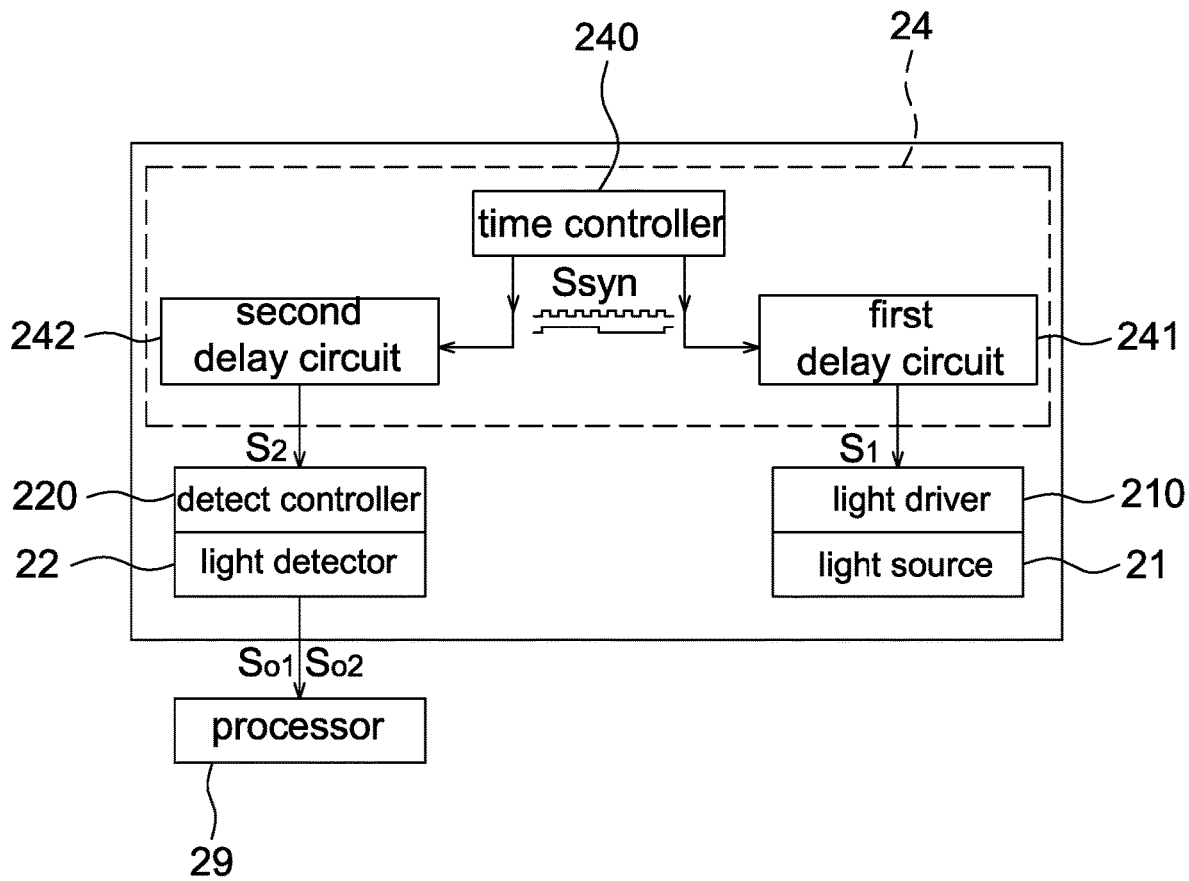
FIG. 4 is another schematic block diagram of a distance measurement device according to one embodiment of the present disclosure.

Please referring to FIG. 4, it is another schematic block diagram of a distance measurement device 200 according to one embodiment of the present disclosure. The time control circuit 24 includes a time controller 240, a first delay circuit 214 and a second delay circuit 242. The time controller 24 is used to provide a synchronous signal $S_{syn}$. After passing the first delay circuit 241, the synchronous signal $S_{syn}$ is used as the light driving signal S1 that is used to turn on and off the light source 21 via a light source driver 210 (e.g., generating voltages or currents corresponding to the light driving signal S1). After passing the second delay circuit 242, the synchronous signal $S_{syn}$ is used as the detecting control signal S2 that is used to activate the light detecting of the light detector 22 via a detect controller 220, e.g., turning on and off a transistor switch corresponding to the detecting control signal S2. The first delay circuit 241 is used to delay a phase of the light driving signal S1. The second delay circuit 242 is used to delay a phase of the detecting control signal S2.

In FIG. 4, the detection switch 23, the first accumulator 251 and the second accumulator 252 are omitted.

The processor 29 is, for example, a digital signal processor (DSP) or an application specific integrated circuit (ASIC), and used to calculate an operating phase (e.g., the first phase and the second phase mentioned below) according to the first light energy E1 and the second light energy E2. In one aspect, the processor 29 calculates the operating phase using an equation: operating phase=E2/(E1+E2), which is corresponding to the time interval Tf shown in FIG. 3.

Figure 5:
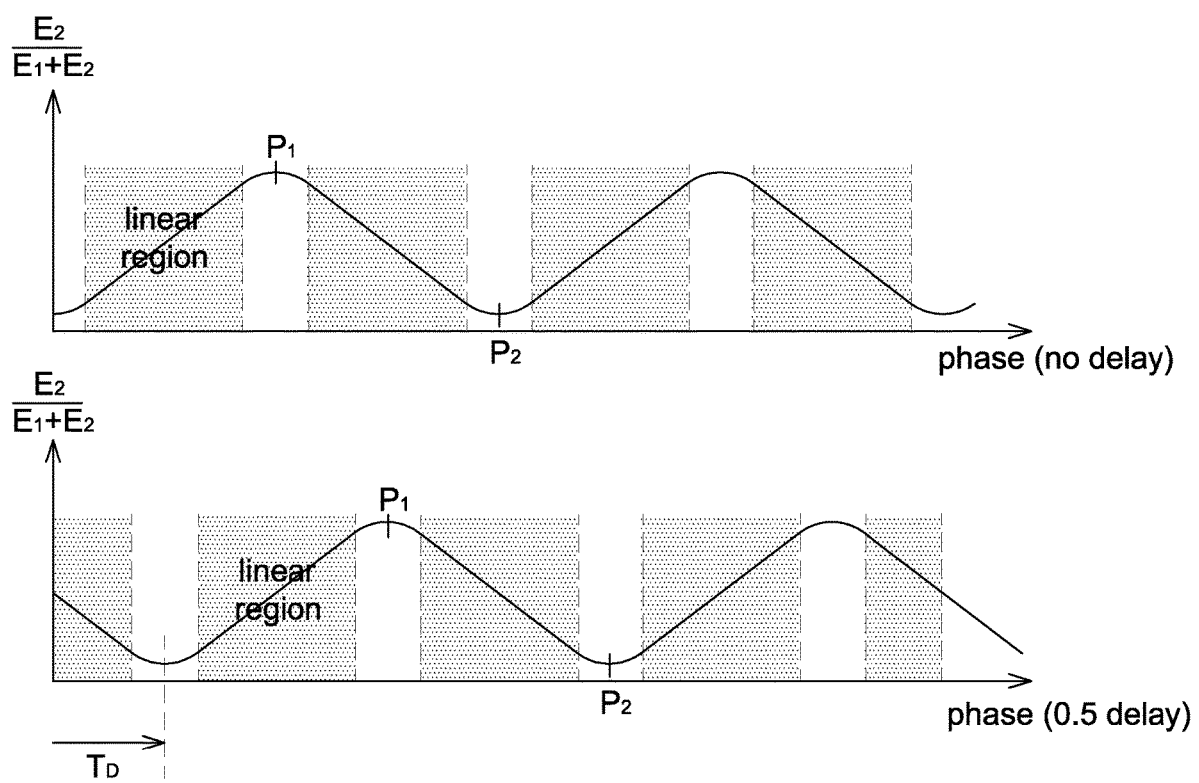
FIG. 5 is a schematic diagram of the detected phases of a distance measurement device according to one embodiment of the present disclosure.

Please referring to FIG. 5, it is a schematic diagram of the detected phases calculated by the processor 29. In the scenario that the light driving signal S1 and the detecting control signal S2 have no phase delay therebetween, it is seen from FIGS. 2 and 3 that when the object O gradually leaves away from distance 0 (i.e. Tf increasing from 0) in the first exposure interval, a value of E2/(E1+E2) gradually increases and a maximum value of E2/(E1+E2) is reached, e.g., reaching point P1 in FIG. 5, when the phase of reflected light is aligned with the second time interval T2 of the first exposure interval. If the object O continuously moves farther away to cause the phase of reflected light enters the second exposure interval in FIG. 3, a value of E2/(E1+E2) gradually decreases and a minimum value of E2/(E1+E2) is reached, e.g., reaching point P2 in FIG. 5, when the phase of reflected light is aligned with the first time interval T1 of the second exposure interval. The phase curve will vary in this way repeatedly as shown in FIG. 5.

Generally, as the feature of the light source 21 is temperature dependent, different modulation parameters are generated under different operating temperatures to cause the phase curve has non-linear regions, e.g., near the maximum values (e.g., P1) and minimum values (e.g., P2). It is seen from FIG. 5 that one E2/(E1+E2) finds multiple corresponding phases. In the present disclosure, only the first linear region (e.g., linear regions being shown filled with dots) is used to calculate the object distance to prevent calculating incorrect object distance due to mis-identifying a current phase. The object distance is calculated using the current phase, e.g., object distance=(E2/(E1+E2))×(c/2)×P, wherein c is light speed and P is the light modulation period. FIG. 5 also shows a phase curve (at lower row) when the detecting control signal S2 lags the light driving signal S1 by a half light modulation period $T_D$. With the delay $T_D$, the time interval Tf in FIG. 3 is equal to $T_D$+E2/(E1+E2). That is, a time difference between the detecting control signal S2 and the light driving signal S1 can change a length of Tf such that the calculated object distance is also changed.

As mentioned above, because in the present disclosure only the first linear region of the phase curve in FIG. 5 is used to calculate an object distance, a range of the first linear region determines a detectable distance range and is determined according to the light modulation frequency. In the present disclosure, the two-stage measurement is used to confirm the object distance.

Please referring to FIGS. 2 to 6, operation of the distance measurement device 200 of the present disclosure is described below. For simplification purposes, FIG. 6 only shows the first linear regions corresponding to the light modulation frequency F1 without delay time and the light modulation frequency F2 having different delay times (or referred to delay phases), wherein Del=−0.5 to 3.5 indicate a ratio of the delay time with respect to the exposure interval (or light modulation period). For illustration purposes, FIG. 6 shows the first linear regions corresponding to the light modulation frequency F2 at different delay times at two rows and filled with dots.

Figure 6:
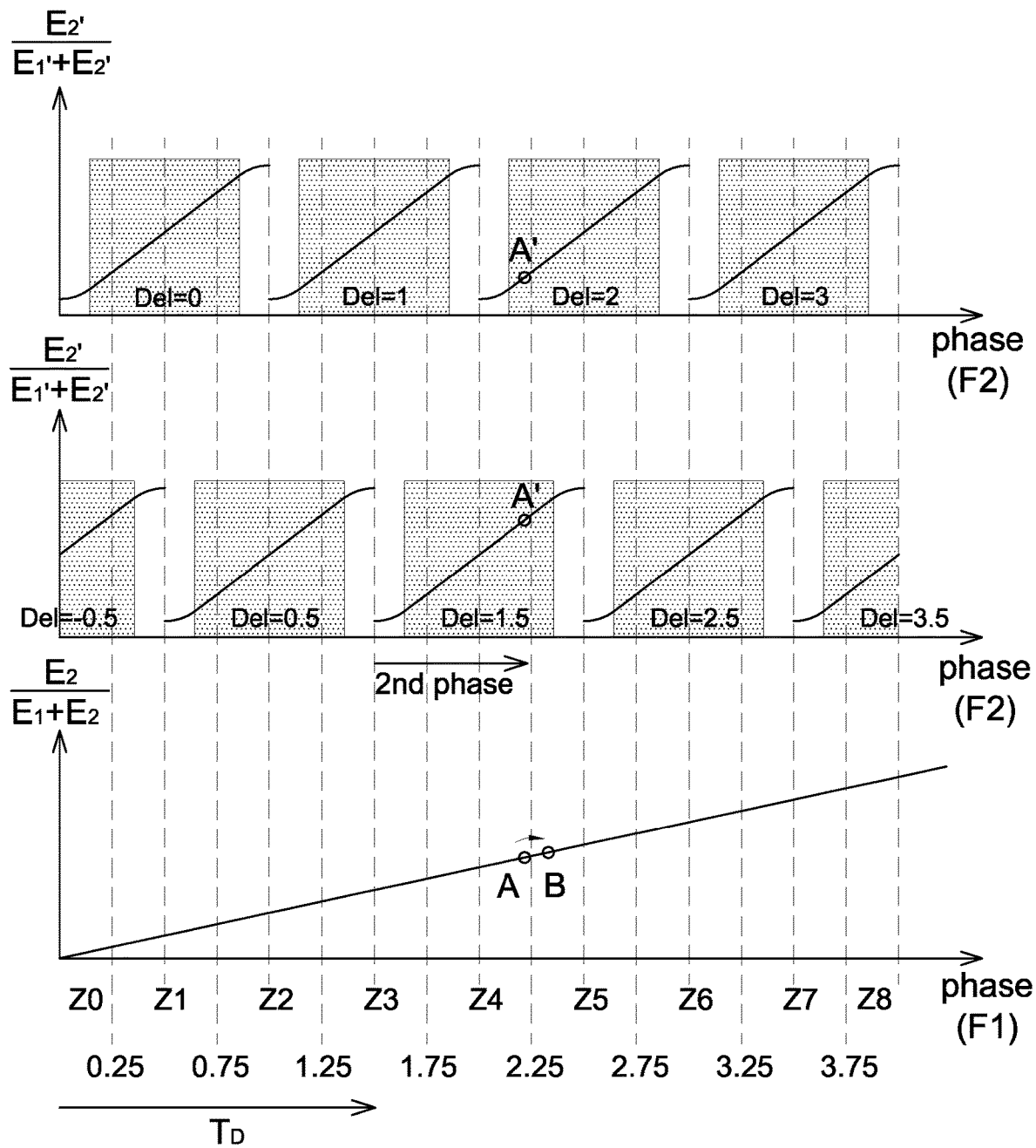
FIG. 6 is another operational schematic diagram of a distance measurement device according to one embodiment of the present disclosure.

The time control circuit 24 controls the light source 21 to emit light to illuminate the object O using the light driving signal S1 with the first modulation frequency F1 in first measurement, and controls the light source 21 to emit light to illuminate the object O using the light driving signal S1 with the second modulation frequency F2 in second measurement, wherein the second modulation frequency F2 is higher than the first modulation frequency F1, e.g., FIG. 6 showing F2=4×F1. Therefore, a linear region of the phase curve obtained in the first measurement is substantially four times of a linear region of the phase curve obtained in the second measurement. That is, a detectable distance range in the first measurement is substantially four times of a detectable distance range in the second measurement.

In the first measurement, the time control circuit 24 controls the light detector 22 to detect reflected light from the object O using the detecting control signal S2 with the frequency F1 to generate a first detection signal So1, wherein the first detection signal So1 is accumulated by the first accumulator 251 and the second accumulator 252 to respectively form the first light energy E1 and the second light energy E2 (e.g., referring to FIG. 3). In this stage, preferably there is no delay phase between the light driving signal S1 and the detecting control signal S2.

Similarly, in the second measurement, the time control circuit 24 controls the light detector 22 to detect reflected light from the object O using the detecting control signal S2 with the frequency F2 to generate a second detection signal So2, wherein the second detection signal So2 is accumulated by the first accumulator 251 and the second accumulator 252 to respectively form first light energy E1' and second light energy E2'.

The processor 29 calculates a first phase according to the first detection signal So1, e.g., E2/(E1+E2) at point A in FIG.

6, wherein as a lower modulation frequency F1 is used in the first measurement to have a lower SNR, the first phase in the present disclosure is called a rough phase. Meanwhile, the processor 29 identifies an operating phase zone (e.g., FIG. 6 showing the point A within the fourth phase zone Z4) according to the first phase to determine a delay time (or called delay phase), e.g., FIG. 6 showing delaying 1.5 of the modulation period of F2. In the present disclosure, the processor 29 does not use the first phase to calculate the object distance, i.e. not calculating $(c/2) \times P_{F1} \times E2/(E1+E2)$, wherein $P_{F1}$ is the modulation period of F1, and does not output an object distance corresponding to the first phase.

In the present disclosure, the memory (e.g., volatile memory and/or non-volatile memory) 27 previously records the relationship between multiple predetermined operating phase zones (e.g., phase zones Z0 to Z8 shown in FIG. 6) and multiple delay times (e.g., Del=−0.5 to 3.5 shown in FIG. 6). For example, when the detecting control signal S2 lags behind the light driving signal S1, the delay time is set as a positive value (e.g., Del=0.5 to 3.5 shown in FIG. 6); whereas, when the light driving signal S1 lags behind the detecting control signal S2, the delay time is set as a negative value (e.g., Del=0.5 shown in FIG. 6). When there is not phase difference between S1 and S2, Del=0.

When the processor 129 calculates the first phase, the delay time is obtained by accessing the memory 27. The processor 129 informs the time control circuit 24 to delay one of the detecting control signal S2 and the light driving signal S1 in the second measurement corresponding to the operating phase zone at which the first phase locates, i.e. controlling one of the first delay circuit 241 and the second delay circuit 242.

In the second measurement, the time control circuit 24 controls the light driving signal S1 and the detecting control circuit S2 to have a difference equal to the delay time. The processor 29 calculates a second phase according to the second detection signal So2 detected by the light detector 22, e.g., $E2'/(E1'+E2')$ being shown at point A' in FIG. 6, wherein as the second measurement uses a higher modulation frequency F2 to have a higher SNR, the second phase is referred to a fine phase in the present disclosure. The processor 29 calculates and outputs an object distance according to the second phase, e.g., object distance $=(c/2) \times P_{F2} \times (T_D + E2'/(E1'+E2'))$, wherein $P_{F2}$ is the modulation period of F2 and $T_D$ is the delay time obtained in the first measurement. In other words, the processor 29 takes a summation of the delay phase $T_D$ and the fine phase $E2'/(E1'+E2')$ as a flying time.

Accordingly, although the second measurement has a smaller detectable distance range, by using the first measurement to confirm a delay time $T_D$, it is still able to significantly extend a total detectable distance range in the second measurement. As shown in FIG. 6, when the first phase is calculated behind the fifth phase zone Z5, the delay time $T_D$ is larger than a period of the second modulation frequency F2.

Figure 7:
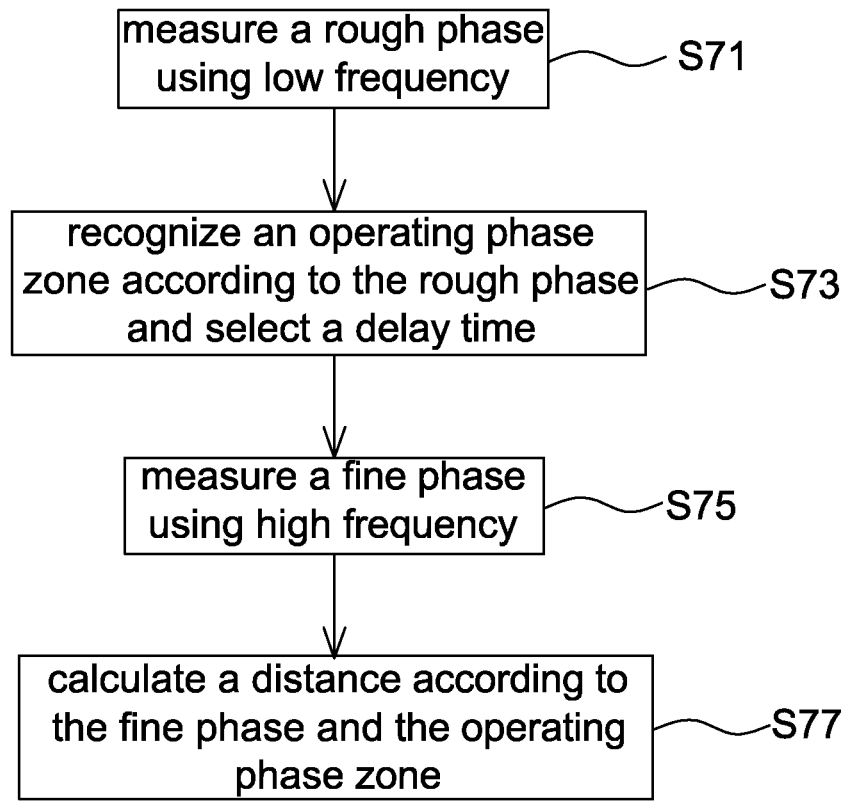
FIG. 7 is a flow chart of a distance measurement device according to one embodiment of the present disclosure.

Please referring to FIG. 7, it is a flow chart of an operating method of a distance measurement device 200 according to one embodiment of the present disclosure, including the steps of: measuring a rough phase using a low frequency (Step S71); recognizing an operating phase zone according to the rough phase and selecting a delay time (Step S73); measuring a fine phase using a high frequency (Step S75); and calculating a distance according to the fine phase and the operating phase zone (Step S77).

Please referring to FIGS. 2 to 7, details of the operating method are described below.

Step S71: In the first measurement, the time control circuit 24 controls, using the light driving signal S1, the light source 21 to emit light at a first modulation frequency F1, and controls, using the detecting control signal S2 (e.g., a time-varying signal also having frequency F1), the light detector 22 to detect reflected light from the object O to generate a first detection signal So1. As mentioned above, the first accumulator 251 and the second accumulator 252 accumulate the light energy from the light detector 22 to generate first light energy E1 and second light energy E2, respectively.

Step S73: Next, the processor 29 calculates a first phase $E2/(E1+E2)$ according to the first detection signal So1 and identifies an operating phase zone at which the first phase locates, e.g., FIG. 6 showing at the fourth phase zone Z4. The processor 29 determines a delay time (e.g., Del=1.5) according to the calculated first phase, e.g., by accessing the memory 27.

Step S75: In the second measurement, the processor 29 informs the time control circuit 24 to cause the light driving signal S1 and the detecting control signal S2 to have the delay time therebetween (e.g., the processing 29 sending a control signal to the first delay circuit 241 or the second delay circuit 242), wherein corresponding to the operating phase zone being calculated, the time control circuit 24 delays one of the light driving signal S1 and the detecting control signal S2. The time control circuit 24 controls, using the light driving signal S1, the light source 21 to emit light at a second modulation frequency F2 higher than the first modulation frequency F1, and controls, using the detecting control signal S2 (e.g., a time-varying signal also having frequency F2), the light detector 22 to detect reflected light from the object O to generate a second detection signal So2. Similarly, the first accumulator 251 and the second accumulator 252 accumulate the light energy from the light detector 22 to generate first light energy E1' and second light energy E2', respectively.

Step S77: Finally, the processor 29 calculates a second phase $E2'/(E1'+E2')$ according to the second detection signal So2 to accordingly calculate and output a current object distance, e.g., object distance=$(c/2) \times P_{F2}(T_D+E2'/(E1'+E2'))$.

One of benefits of the present disclosure is that even the first phase is deviated to a point B (as shown in FIG. 6) in the fifth phase zone Z5 in the first measurement due to noises, as in the second measurement the linear regions corresponding to the delay phase Del=2 (i.e. Z5) and Del=1.5 (i.e. Z4) are partially overlapped, an identical phase A' is obtained no matter which of the phase zones Z4 and Z5 is used to calculate the fine phase. In other words, a number of phase zones corresponding to the first modulation frequency F1 is divided corresponding to the circuit parameter of the distance measurement device 200 and is not limited to that shown in FIG. 6. Preferably, the arrangement of the delay time is selected to cause adjacent linear regions of the high modulation frequency to partially overlap with each other to increase the noise immunity.

In the present disclosure, as the first measurement has a lower SNR, the phase A may not be identical to the phase A' due to the deviation cause by noises.

It should be mentioned that although FIG. 4 shows the time control circuit 24 includes two delay circuits, the present disclosure is not limited thereto. In the scenario that only one of the light driving signal S1 and the detecting control signal S2 needs to be delayed (e.g., determined according to a position of an object to be detected), the time control circuit 24 includes a single delay circuit.

It is appreciated that the values mentioned in the above embodiment, e.g., a ratio of high/low frequencies, the delay time or delay phase and a number of phase zones, are only intended to illustrate but not to limit the present disclosure. In other aspects, if a longer detectable distance range is required, it is possible to use multiple light driving frequencies to perform more than two times of measurement (e.g., sequentially increasing the driving frequency) to achieve the same benefits.

As mentioned above, in the conventional iTOF detection technique, it is necessary to make a trade-off between the SNR and the detectable distance range. A negative influence always exist no matter the light modulation frequency is increased or decreased. Accordingly, the present disclosure further provides a distance measurement device using iTOF technique (e.g., FIGS. 2 and 4) and an operating method thereof (e.g., FIGS. 6-7) that perform measurement by two times through altering the light modulation frequency. In this way, benefits of a large detectable distance range and high SNR are achieved, and high noise immunity is realized.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. A time-of-flight device, comprising:
a light source, configured to illuminate an object sequentially using a first modulation frequency and a second modulation frequency, higher than the first modulation frequency, according to a light driving signal;
a light detector, configured to detect reflected light from the object to generate a first detection signal corresponding to the light source being illuminating at the first modulation frequency and detect reflected light from the object to generate a second detection signal corresponding to the light source being illuminating at the second modulation frequency according to a detecting control signal;
a processor, configured to
calculate an operating phase zone of a first phase according to the first detection signal,
determine a delay time according to a relationship between multiple predetermined operating phase zones and multiple delay times, and
use the delay time as a difference between the light driving signal and the detecting control signal when the light source is illuminating at the second modulation frequency.

2. The time-of-flight device as claimed in claim 1, wherein the light detector is a photodiode or an avalanche diode.

3. The time-of-flight device as claimed in claim 1, wherein the processor is further configured to calculate a second phase according to the second detection signal.

4. The time-of-flight device as claimed in claim 1, further comprising a time control circuit coupled to the light source, the light detector and the processor, wherein the time control circuit is configured to delay one of the detecting control signal and the light driving signal according to the delay time determined according to the operating phase zone in which the first phase locates.

5. The time-of-flight device as claimed in claim 1, wherein the delay time is larger than a period of the second modulation frequency.

6. The time-of-flight device as claimed in claim 3, wherein the processor is further configured to take a summation of the second phase and the delay time as a flying time.

7. The time-of-flight device as claimed in claim 3, further comprising:
a first accumulator, configured to accumulate first light energy detected by the light detector within a first time interval; and
a second accumulator, configured to accumulate second light energy detected by the light detector within a second time interval,
wherein the processor is configured to calculate the first phase and the second phase according to the first light energy and the second light energy.

8. A time-of-flight device, comprising:
a light source, configured to emit light to illuminate an object;
a light detector, configured to detect reflected light from the object to generate a detection signal;
a time control circuit, configured to control the light source to illuminate at a first modulation frequency in first measurement and to illuminate at a second modulation frequency, higher than the first modulation frequency, in second measurement, the time control circuit comprising:
a first delay circuit, configured to delay a phase of a light driving signal of the light source; and
a second delay circuit, configured to delay a phase of a detecting control signal of the light detector; and
a processor, configured to
calculate a rough phase according to the detection signal generated by the light detector in the first measurement, and
determine a delay phase between the light driving signal and the detecting control signal in the second measurement according to a relationship between predetermined multiple phase zones of the rough phase and multiple delay times.

9. The time-of-flight device as claimed in claim 8, wherein the processor is further configured to calculate a fine phase according to the detection signal generated by the light detector in the second measurement.

10. The time-of-flight device as claimed in claim 9, wherein the processor is further configured to take a summation of the delay phase and the fine phase as a flying time.

11. The time-of-flight device as claimed in claim 8, wherein the delay phase between the light driving signal and the detecting control signal is 0 in the first measurement.

12. The time-of-flight device as claimed in claim 9, further comprising:
a first accumulator, configured to accumulate first light energy detected by the light detector within a first time interval; and
a second accumulator, configured to accumulate second light energy detected by the light detector within a second time interval,
wherein the processor is configured to calculate the rough phase and the fine phase according to the first light energy and the second light energy.

13. An operating method of a time-of-flight device, the time-of-flight device comprising a light source, a light detector and a processor, the operating method comprising:
controlling, using a light driving signal, the light source to illuminate at a first modulation frequency, and controlling, using a detecting control signal, the light detector to detect reflected light from an object to generate a first detection signal;

calculating, using the processor, an operating phase zone of a first phase according to the first detection signal;

determining a delay time according to a relationship between multiple predetermined operating phase zones and multiple delay times; and controlling, using the light driving signal, the light source to illuminate at a second modulation frequency, higher than the first modulation frequency, and controlling, using the detecting control signal, the light detector to detect reflected light from the object to generate a second detection signal with the delay time between the light driving signal and the detecting control signal.

14. The operating method as claimed in claim 13, wherein the detecting control signal lags the light driving signal by the delay time when the light source is controlled to illuminate at the second modulation frequency.

15. The operating method as claimed in claim 13, wherein the light driving signal lags the detecting control signal by the delay time when the light source is controlled to illuminate at the second modulation frequency.

16. The operating method as claimed in claim 13, further comprising:

calculating, using the processor, a second phase according to the second detection signal.

17. The operating method as claimed in claim 16, further comprising:

taking, using the processor, a summation of the second phase and the delay time as a flying time.

18. The operating method as claimed in claim 13, wherein the delay time between the light driving signal and the detecting control signal is 0 when the light source is controlled to illuminate at the first modulation frequency.

19. The operating method as claimed in claim 16, further comprising:

calculating, by the processor, an object distance using the second phase without using the first phase.

* * * * *